United States Patent [19]
Grieser et al.

[11] Patent Number: 5,788,395
[45] Date of Patent: Aug. 4, 1998

[54] JOINT FORMING DEVICES

[75] Inventors: Jerry D. Grieser, Archbold; Richard A. Nelson, Napoleon; Steven R. Munday, Stryker, all of Ohio; William E. T. Vallance, Marlow, England

[73] Assignees: Sauder Woodworking Company, Archbold, Ohio; Titus International PLC, Buckinghamshire, United Kingdom

[21] Appl. No.: 656,433

[22] Filed: May 30, 1996

[30] Foreign Application Priority Data

May 31, 1995 [GB] United Kingdom ............. 9511000

[51] Int. Cl.⁶ .................................................. F16B 7/08
[52] U.S. Cl. ................... 403/231; 403/405.1; 403/409.1
[58] Field of Search ........................... 403/231, 405.1, 403/406.1, 407.1, 409.1

[56] References Cited

U.S. PATENT DOCUMENTS

| | | | |
|---|---|---|---|
| 4,202,645 | 5/1980 | Giovannetti | 403/407.1 |
| 4,236,848 | 12/1980 | Rock et al. | 403/231 X |
| 4,332,495 | 6/1982 | Bürgers | 403/6 |
| 4,361,931 | 12/1982 | Schnelle e al. | 403/119 X |
| 4,518,278 | 5/1985 | Koch | 403/230 |
| 4,545,698 | 10/1985 | Koch | 403/231 |
| 4,693,630 | 9/1987 | Giovannetti | 403/405.1 |
| 4,810,127 | 3/1989 | Hettich | 403/231 X |
| 5,143,473 | 9/1992 | Harley | 403/231 |

FOREIGN PATENT DOCUMENTS

| | | |
|---|---|---|
| 794608 | 5/1958 | United Kingdom. |
| 1009985 | 11/1965 | United Kingdom. |
| 1174319 | 12/1969 | United Kingdom. |
| 1571697 | 7/1980 | United Kingdom. |
| 1573172 | 8/1980 | United Kingdom. |
| 2040385 | 8/1980 | United Kingdom. |
| 1582761 | 1/1981 | United Kingdom. |
| 2074282 | 10/1981 | United Kingdom. |
| 2119052 | 11/1983 | United Kingdom. |
| 2119053 | 11/1983 | United Kingdom. |
| 5172076 | 9/1986 | United Kingdom. |
| 2241299 | 8/1991 | United Kingdom. |
| 2246826 | 2/1992 | United Kingdom. |
| 2277973 | 11/1994 | United Kingdom. |
| 2285106 | 6/1995 | United Kingdom. |

*Primary Examiner*—Kenneth J. Dorner
*Assistant Examiner*—Andrea Chop
*Attorney, Agent, or Firm*—Emch, Schaffer, Schaub & Porcello Co., L.P.A.

[57] ABSTRACT

A joint forming device for use in forming a joint between two members comprising an elongate fastening element, a tightening element having at least one arcuate camming surface for cooperably engaging an engaging portion of the fastening element and at least one housing for the fastening element and the tightening element with the or each camming surface and the engaging portion positioned for the cooperable engagement. The housing includes a first housing for housing the tightening element, a second housing for housing at least an expansion portion of the fastening element and at least one member connecting the first and second housings. The first housing and the second housing are adapted for cooperative engagement with the tightening element and the fastening element, respectively. In use, the first housing is fitted to a recess in one of the joint members and the second housing is fitted to a recess in the other the joint members to form a joint therebetween. Rotation of the tightening element in one sense about an axis of rotation thereof causes axial movement of the fastening element towards the axis of rotation causing the joint to tighten. The first housing and the second housing each expand generally radially outwardly during rotation of the tightening element for forceably engaging walls of their respective recesses.

25 Claims, 6 Drawing Sheets

JOINT FORMING DEVICES

The invention relates to joint forming devices and particularly, but not exclusively to joint forming devices for forming a joint between two members of an item of knock-down furniture.

A known joint forming device for forming a joint between two members, or panels, of an item of knock-down furniture comprises a fastening element in the form of an elongate pin which is screwed into one panel and a tightening element in the form of a rotatable camming element which is fitted in a recess in the other panel and arranged to receive a head portion of the pin. A joint can be formed between the two panels by bringing them together so that the head portion is received in the camming element and rotating same. The camming element grips the head portion of the pin and as it is rotated pulls the pin inwardly towards the axis of rotation thereof thereby drawing the two panels together. Such a joint forming device is disclosed in GB 2241299B and GB 2246826B.

Knock-down furniture is typically supplied to the customer in a "flatpack" comprising a number of disassembled furniture panels and a package containing a multiplicity of components for use in assembling the item of furniture including joint forming devices of the known type described in the last preceding paragraph. The furniture panels are provided with recesses and bores for receiving the joint forming devices and other components. Purchasers of flatpack furniture often experience difficulty in identifying which components should be fitted into the various recesses and bores in the furniture panels which can lead to customer frustration and/or incorrect fitting of the components which may in turn cause damage to the components and/or the furniture panels. Furthermore, if the item of furniture utilizes many joint forming devices of the known type, the screwing in of the pin involves considerable labor for the assembler. A further problem that sometimes occurs is that an insufficient number of components for the joint forming devices is provided in the flatpack.

GB 2277973A and UK patent application no. 9326352.3 each disclose a joint forming device which can be fitted to the panels of an item of furniture prior to flatpacking thereof so that a person assembling the furniture item has only to bring the panels together and tighten the joint forming devices in order to assemble the furniture item. No fitting of the individual parts of the joint forming devices to the panels is required by the purchaser. However, assembling joint forming devices to the panels at the point of manufacture greatly increases the cost of the furniture item.

Figure 6:
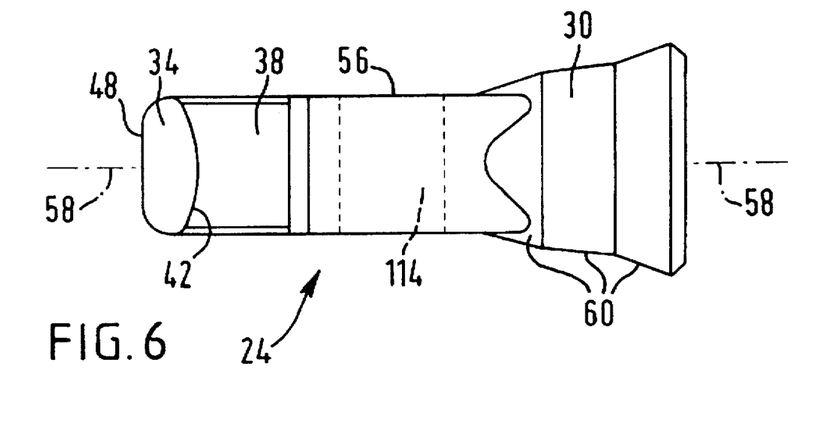
FIG. 6 is a side view of the fastening element.

A further problem with known joint forming devices arises if it is desired to remove parts thereof from the panels for disassembling the furniture item for re-packing or because the part has been wrongly fitted to the panel. For example, in the case of the joint forming devices disclosed in GB 22412299B and GB 2246826B it is necessary to individually unscrew each pin from the panel which involves considerable labor. Furthermore, repeated screwing and unscrewing of the pins can damage the recesses therefor in the panels, particularly if the panel is made of chipboard or particle board. In another example, the camming element may be housed in a sleeve which is force fitted into a recess in one of the panels as illustrated in FIG. 6 of GB 2277973A. It is often impossible to remove the sleeve if incorrectly fitted to the panel without damaging the sleeve and/or the panel.

In recent years there has been a tendency to manufacture more expensive and better quality knock-down furniture items comprising veneered panels made of high density particle board. Purchasers of more expensive knock-down furniture do not generally regard this as disposable and typically wish to be able to disassemble this for transit purposes when, for example, moving house or office premises.

In the field of knock-down furniture, manufacturers would like to be able to provide a unitary joint forming device which the purchaser of a furniture item can fit to the recesses provided therefor in the joint members without the aid of tools, preferably as a light press fit, which can be easily released for disassembly of the joint and is re-usable so that items of furniture with which it is used can be readily disassembled and subsequently reassembled.

It is an object of the invention to at least in part overcome the above-described disadvantages of previous joint forming devices to provide an improved joint forming device which at least in part meets the above-mentioned requirements of knock-down furniture manufacturers.

Accordingly, the invention provides a joint forming device for use in forming a joint between two members, the device comprising an elongate fastening element, a tightening element having at least one arcuate camming surface for cooperably engaging an engaging portion of said fastening element and means housing said fastening element and said tightening element with the or each said camming surface and said engaging portion positioned for said cooperable engagement, said housing means comprising a first housing housing said tightening element, a second housing housing at least an expansion portion of said fastening element and means connecting said first and second housings, whereby in use with said first housing fitted to a recess in one of said joint members and said second housing fitted to a recess in the other of said joint members to form a joint therebetween, rotation of said tightening element in one sense about an axis of rotation thereof causes axial movement of said fastening element towards said axis of rotation causing said joint to tighten, said first housing and said second housing each being adapted to expand generally radially outwardly during said rotation of the tightening element for forceably engaging walls of their respective recesses.

Preferably said connecting means resiliently connects said housings.

The connecting means may comprise flexible membrane means.

The first and second housings may each comprise two body parts, said body parts of the first and second housings being snap-fittable together.

The respective body parts of said first housing and second housing may join in a common plane when snap-fitted together.

In one embodiment, the first housing, second housing and connecting means are integral, said connecting means having the form of a coil spring.

In another embodiment, the first housing, second housing and connecting means are integral, said connecting means comprising a ring element connecting with respective opposed struts extending from said first housing and said second housing, said struts extending from the first housing being radially offset with respect to said struts extending from the second housing.

The first housing, second housing and connecting means may comprise a one-piece plastics molding.

The second housing may be releasably connected with said first housing by said connecting means. In which case, said connecting means may comprise flexible membrane means and said first housing defines recess means for receiving and engaging with said flexible membrane means.

The first housing may comprise at least one moveable portion adapted to move generally radially outwardly of an outer periphery of the first housing for at least in part providing said radially outward expansion of the first housing.

The or each moveable portion may be resiliently deflectable in response to said rotation of the tightening element.

The or each moveable portion may be an integral part of the first housing separated partly from the remainder thereof by one or more slots provided in said first housing.

The or each moveable portion may be separated partly from the remainder of the housing by a generally L-shaped slot.

The tightening element may comprise external cam means for causing said generally radially outward expansion of the first housing.

The or at least one said moveable portion may comprise cam means, said cam means being cooperable with the tightening element for causing said generally radially outward movement of the or each moveable portion.

The first housing may comprise formations for cooperably engaging with formations of said tightening element for facilitating locking of the joint forming device.

The formations of the first housing may comprise a plurality of circumferentially spaced depressions in a surface of the first housing which surface defines a recess for housing the tightening element and the formations of the tightening element comprise a plurality of protrusions on an external surface of the tightening element.

The tightening element may comprise cam means for causing axial movement of said fastening element in a direction away from said axis of rotation on rotation of said tightening element in the sense opposite said one sense for facilitating release of said fastening element from a tightened condition.

The cam means may comprise a surface which extends generally parallel to said axis of rotation of the tightening element for engaging a leading end of said fastening element.

The engaging portion of the fastening element may comprise a respective engaging surface for the or each said arcuate camming surface, the or each engaging surface having a length extending transversely of a longitudinal axis of the fastening element and being adapted such that said cooperable engagement with the respective arcuate camming surface in the direction of the length of the arcuate camming surface occurs substantially over the length of the engaging surface.

In a direction transverse the length thereof the or each engaging surface may extend radially outwardly and axially inwardly with respect to the longitudinal axis of the fastening element.

The engaging portion may comprise two said engaging surfaces, each said engaging surface being defined by a wall of a respective slot extending transversely of the longitudinal axis of the fastening element.

The engaging portion of the fastening element may have a generally rectangular transverse cross-section.

Preferably, the first housing and second housing each comprise external formations for gripping said wall of their respective recesses.

In order that the invention may be well understood, some embodiments thereof which are given by way of example only, will now be described with reference to the accompanying drawings, in which.

Referring to FIGS. 1 to 7 a joint forming device comprises a housing means 20, a tightening element 22 and a fastening element 24. The housing means 20 comprises a first housing 26 for housing the tightening element 22 and a second housing 28 for housing an expansion portion 30 of the fastening element 24.

Figure 2:
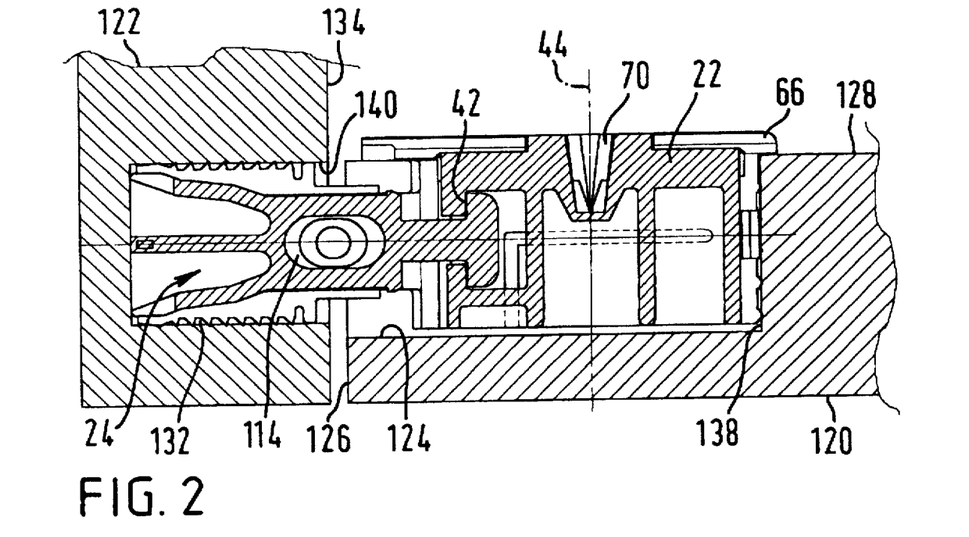
FIG. 2 is a section on line II—II in FIG. 1 showing the joint forming device fitted to two members of a joint.
Figure 4:
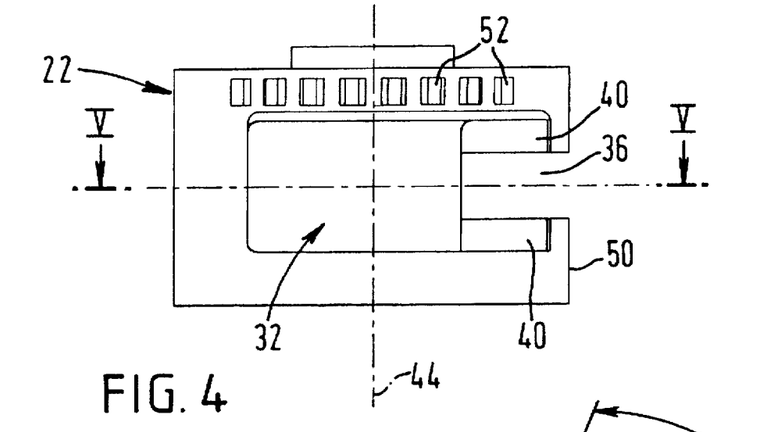
FIG. 4 is a side view of the tightening element.
Figure 5:
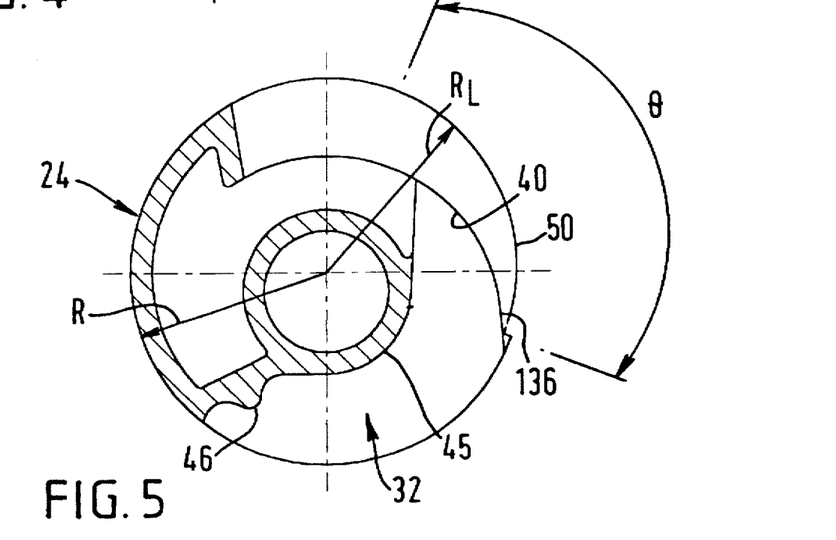
FIG. 5 is a section on line V—V in FIG. 4.

Referring particularly to FIGS. 4 and 5, the tightening element 22 comprises a generally drum-like element having an opening 32 through which an engaging, or head, portion 34 of the fastening element can be inserted into a hollow interior of the tightening element. A slot 36 extends from the opening 32 partially circumferentially of the tightening element and is adapted to receive a neck portion 38 of the fastening element as shown in FIG. 2.

The tightening element 22 further comprises two arcuate camming surfaces 40 adapted to cooperably engage respective discrete engaging surfaces 42 of the head portion 34 of the fastening element whereby rotation of the tightening element in a clockwise (as viewed in FIG. 1) sense causes axial movement of the fastening element towards the axis of rotation 44 of the tightening element. In a direction transverse the arcuate length thereof, the camming surfaces 40 extend axially; that is parallel to the axis of rotation 44.

Figure 1:
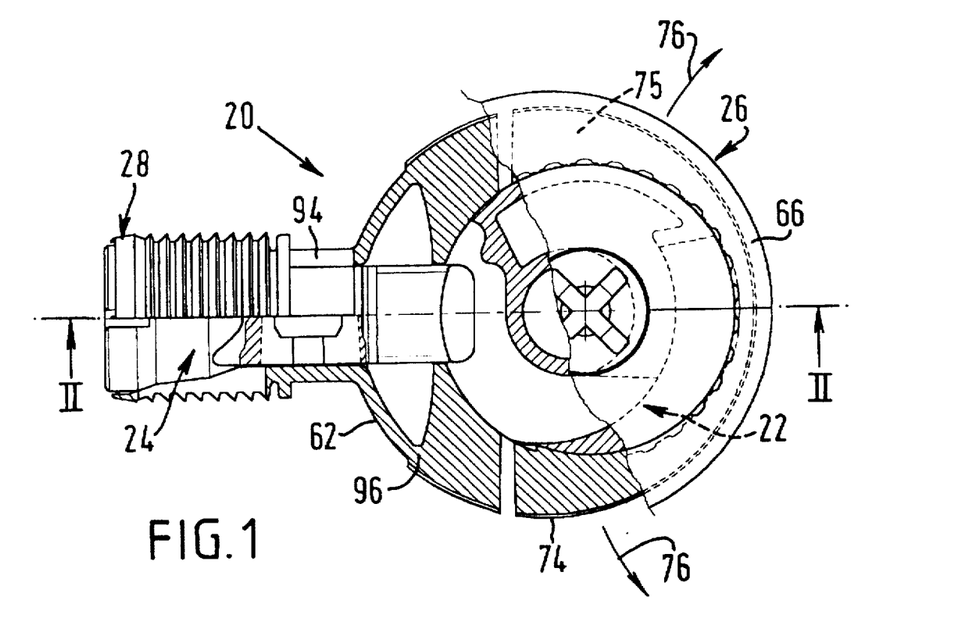
FIG. 1 is a partially sectioned top plan view of a joint forming device.

In addition to the two arcuate camming surfaces 40, the tightening element comprises an internal cam means 45 for causing axial movement of the fastening element in a direction away from the axis of rotation 44 by rotation of the tightening element in an anticlockwise sense for facilitating release of the fastening element from a tightened condition. The internal cam means comprises a surface 45 defining a ridge 46 which extends generally parallel to the axis of rotation 44 for engaging a leading end 48 of the fastening element.

The tightening element is provided with external cam means 50 which in part causes the generally radially outward expansion of the first housing 26. The outer periphery of the tightening element at the lower (as viewed in FIG. 4) end of the tightening element is profiled to define the cam means 50. As best seen in FIG. 5, the tightening element has a generally circular profile defined by a radius R. The cam means 50 includes a section of the lower end outer periphery having an angular extent θ of approximately 90° which has a varying radial extent $R_L$ which is less than R. The reduction in the radial extent $R_L$ of the cam means 50 increases progressively in the clockwise direction of the section defined by the angle θ. Thus, the cam means 50 comprises portions having a radius R and a relieved section θ having a radius $R_L$ which is progressively less than radius R over the angular extent thereof.

The tightening element 22 further comprises formations 52 for cooperably engaging formations 54 of the first housing 26 for facilitating locking of the joint forming device. With regard to FIG. 1, the formations 52, 54 have not been illustrated by means of dashed lines as is conventional when depicting hidden detail in order to improve the clarity of the drawings. The formations of the tightening element comprise a plurality of substantially equi-spaced protrusions 52 arranged in two groups spaced 180° apart; one such group is shown in FIG. 4.

With reference to FIG. 6, the fastening element 24 is an elongate pin member comprising a leading end portion formed by the head portion 34 and neck portion 38 which each have a generally rectangular transverse cross-section, the expansion portion 30 and a body portion 56 which extends between the leading end and expansion portions. The neck portion is defined by opposed slots extending transversely of the longitudinal axis 58 of the fastening element. The engaging surfaces 42 of the fastening element are each defined by a wall of a respective one of the slots which define the neck portion 38 and have a length extending transversely of the longitudinal axis 58. The engaging surfaces 42 are each curved along said length and that curvature is adapted to substantially match the curvature of the respective arcuate camming surfaces 40; that is, the curve of the camming surfaces in the arcuate direction thereof. It will be appreciated that by curving the engaging surface 42 in the lengthwise direction thereof to substantially match the curvature of the camming surfaces 40, engagement between the respective surfaces in the direction of the length of the arcuate camming surface occurs substantially over the length of the engaging surface.

As shown in FIG. 2, the engaging surfaces 42, in a direction transverse the longitudinal axis 58 of the fastening element, extend radially outwardly and axially inwardly with respect to the longitudinal axis 58. In effect the engaging surfaces 42 are undercut in the transverse direction thereof.

The expansion portion 30 has a generally circular transverse cross-section and comprises a plurality of taper portions 60. The function of the expansion portion 30 and its interaction with the second housing 28 will be described in more detail below.

The first housing 26 and the second housing 28 are connected by a resilient connecting means comprising flexible membranes 62. The arrangement of the first and second housings is such that the tightening and fastening elements when housed therein are positioned such that the engaging surfaces 42 of the fastening element can be engaged by the respective camming surfaces 40 by rotation of the tightening element.

Figure 3:
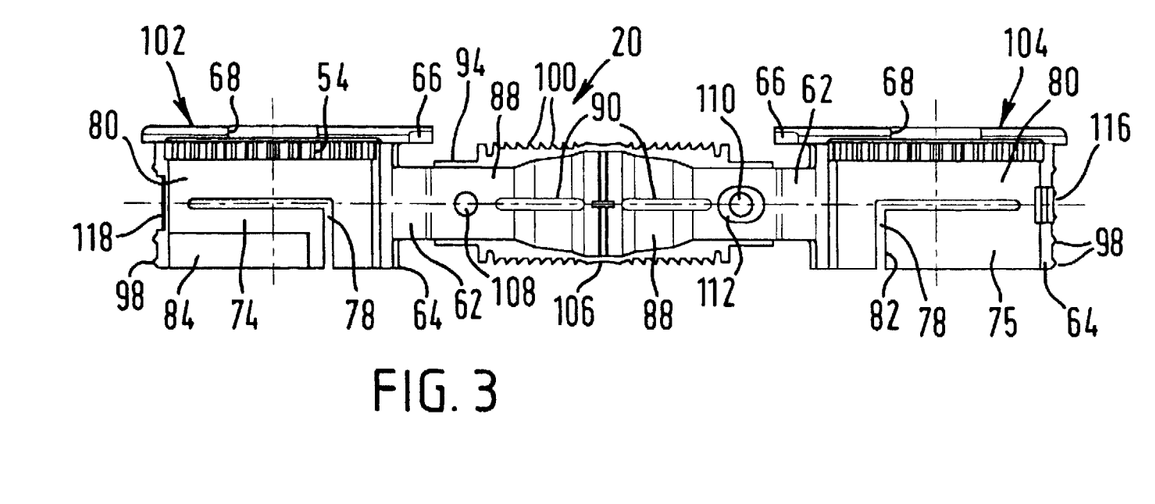
FIG. 3 is a side view of a housing of the joint forming device in an open condition for installation of a fastening element and a tightening element.

In FIG. 3, the housing means 20 is shown in an open condition in which form it can be manufactured as a one-piece split plastics molding as will be described in more detail below. The housing means is shown in a closed, use, condition in FIG. 1.

The first housing 26 comprises a sleeve portion 64 and a generally planar cap portion 66 across one end of the sleeve portion 64. The cap portion 66 is provided with a centrally disposed through-passage 68 through which the tightening element, and more particularly a screwdriver slot 70 thereof, can be accessed in use of the joint forming device.

The first housing 26 comprises two oppositely disposed moveable portions 74, 75. The moveable portions 74, 75 are adapted to move generally radially outwardly of the outer periphery of the sleeve portion 64 as indicated by the arrows 76 in FIG. 1. This movement, at least in part, provides a radially outward expansion of the first housing.

Each moveable portion 74, 75 is an integral part of the sleeve portion 64 and is separated partly from the remainder of the sleeve portion by a generally L-shaped slot 78 as best seen in FIG. 3. The slots 78 extend between the outer periphery of the sleeve portion 64 and an interior surface 80 thereof which surface cooperates with the cap portion 66 to define a generally circular recess for receiving the tightening element 22. Each of the moveable portions 74, 75 has a free end 82 defined by the respective slot 78.

The moveable portion 74 is provided with cam means comprising a rib 84 which is disposed internally of the sleeve portion 64 for cooperating with the cam means 50 of the tightening element to cause the generally radially outward movement of the moveable portions 74, 75. The rib 84 extends lengthwise of the moveable portion 74 and has a height above the interior surface 80 which is greatest adjacent the free end 82 of the moveable portion 74. The variation in the height of the rib 84 corresponds substantially to the varying radial extent $R_L$ of the cam means so as to provide a substantially continuous contact between the moveable portion 74 and the relieved section θ of the cam means 50; that is, the profile of the rib 84 is adapted to compliment the profile of the relieved section θ of the cam means 50.

The first housing 26 includes the formations 54 for cooperably engaging the protrusions 52 of the tightening element. The formations of the first housing 26 comprise substantially equi-spaced depressions 54 disposed along the length of the interior surface 80.

The second housing 28 is a generally cylindrical bush having a through-passage 88 which has a series of taper portions shaped to correspond with the configuration of the taper portions 60 of the expansion portion 30 of the fastening element. The second housing 28 comprises opposed lengthwise extending slots 90 which facilitate a generally radial outward expansion of the second housing.

The flexible membranes 62 are arcuate in the lengthwise direction thereof and extend from opposite sides of a generally rectangular leading end portion 94 of the second housing to opposite corner regions 96 of the sleeve portion 64.

The first housing and second housing are each provided with external formations for gripping the walls of respective recesses in which they are fitted when the housings are expanded into forceable engagement therewith. The formations of the first housing comprise elongate ribs 98 which extend at least partially circumferentially thereof. The formations of the second housing comprise barbs 100 which extend between the slots 90.

The first housing 26, second housing 28 and flexible membranes 62 are integral and as indicated above, can be manufactured as a one-piece split plastics molding. In more detail and with particular reference to FIG. 3, the housing means 20 comprises a first body part 102 and a second body part 104. Each body part 102, 104 defines one half of the housing means 20. More specifically, the body parts each define one half of the first and second housings 26, 28 and one flexible membrane 62 extending therebetween. The respective ends of the body parts 102, 104 which define the halves of the second housing 28 are connected by hinge portions 106. The body parts can be folded together about the hinge portions 106 to the closed, use, condition shown in FIG. 1.

The body parts 102, 104 are adapted to be snap-fittable together and are shown with the first body part provided with a protrusion 108 which is snap-fittingly engageable in a bore 110 provided in a spigot 112 formed on the second body part 104. As shown in FIG. 2 the fastening element has a through-aperture 114 in which the protrusion 108 and spigot 112 are received when the expansion portion 30 is fitted into the second housing 28. At the end of the sleeve portion remote from the second housing, the body part 104 is provided with a catch element 116 which extends in a generally circumferential direction of the sleeve portion for snap-fitting engagement with a recess, indicated at 118, in the first body part.

As described above, the slots 78 which define the moveable portions 74, 75 extend between the outer periphery of the sleeve portion 64 and the interior surface 80. In order to improve the efficiency of the plastics molding process, and in particular to reduce wear of the tooling, it is envisaged that a thin membrane of the plastics material may be left adjacent the surface 80 so that the slots 74 would not extend to the interior of the sleeve portion. It is envisaged that this membrane would be in the region of 1 mm in thickness and it will be appreciated that such a membrane would not prevent outward movement of the moveable portions 74, 75.

Although not essential, it is envisaged that the joint forming device will be supplied ready assembled as shown in FIG. 1. The device is assembled by first taking the housing means 20 in its open condition, as shown in FIG. 3, and inserting a tightening element 22 into the recess defined by the interior surface 80 in one of the halves of the first housing 26. To allow insertion of a fastening element 24, the opening 32 of the tightening element is positioned so as to face the through-passage 88 of the second housing 28. The fastening element is fitted to the housing means 20 by inserting the expansion portion 30 into the corresponding half of the second housing 28 with the protrusion 108 or spigot 112 extending into the through-aperture 114 of the fastening element depending on which of the two body parts 102, 104 the fastening and tightening elements are inserted into. In this condition, the head portion 34 of the fastening element is positioned internally of the tightening element such that rotation of the tightening element in the clockwise sense will bring the camming surfaces 40 into engagement with the respective engaging surfaces 42 of the fastening element. Assembly of the device is completed by bringing the two body parts together so that the protrusion 108 and bore 110 and the catch element 116 and recess 118 snap-fittingly engage. In this assembled condition, a unitary joint forming device is provided which is ready for fitting to two members for forming a joint therebetween.

With reference to FIG. 2, in order to form a joint between the two members 120, 122, the first housing 26 is fitted into the recess 124 in the joint member 120 with the second housing 28 extending beyond an edge 126 of the member 120. The recess 124 is formed in a major surface 128 of the member 120 and may be positioned so as to open at the edge 126 in order to allow the second housing to extend beyond the edge 126. Alternatively, a further recess may be provided extending between the recess 124 and edge 126. The recess 124 should be sized to allow the first housing to be inserted therein simply by pressing lightly on the cap portion 66. The cap portion 66 serves as a depth stop for the first housing and to cover any chips made in the surface 128 of the member 120 by the forming of the recesses 124.

With the first housing 26 thus installed in the recess 124, assembly of the joint is completed by moving the joint member 122 towards the edge 126 such that the second housing 28 enters a recess 132 formed in a major surface 134 of the member 122. Assembly is complete when the major surface 134 of the member 122 abuts the edge 126. The recess 132 is preferably sized to provide a close clearance fit with the second housing so that substantially no force is required in order to bring the two joint members together with the major surface 134 abutting the edge 126. A gap is shown between the two members to illustrate the advantage of having a flexible connection between the two housings as described in more detail below.

The joint thus assembled is tightened by rotating the tightening element 22 in a clockwise sense by means of a screwdriver inserted in the screwdriver slot 70. The first 90° of rotation of the tightening element moves the opening 32 out of alignment with the through-passage 88 and brings the respective leading ends 136 of the camming surfaces into a position shown in FIG. 7 in which they engage the respective engaging surfaces 42. During that first 90° or so of rotation, the relieved section θ of the cam means 50 moves approximately into line with the through-passage 88 so that a portion of the cam means 50 having a radius R is brought into contact with the rib 84. It will be appreciated that as the tightening element is rotated, the moveable portion 75 is progressively deflected radially outwardly in the direction of arrows 76 as contact with the relieved section θ is replaced by contact with the full radius R portions of the cam means 50. Although the radius of the cam means 50 acting up on the moveable portion 74 does not increase with rotation of the tightening element, the arrangement is such that provided the recess 124 is sized correctly, the moveable portion 75 can only move outwardly to a certain extent before contacting a wall 138 of the recess and thus further expansion of the first housing is generated through outward movement of the moveable portion 74. In more detail, the initial effect of the rotation of the tightening element is that the moveable portion 75 is moved outwardly by the interaction of the rib 84 and cam means 50 until it is forceably engaged with the wall 138 and is thus prevented from moving further. The continued interaction of the cam means 50 and rib 84 as the tightening element is rotated then generates a force which causes the tightening element to move in the sleeve portion in the direction of the moveable portion 74 which is thus caused to move outwardly of the outer periphery of the sleeve portion to a position in which it forceably engages the wall 138. Thus, the first ninety or so degrees of rotation of the tightening element causes a generally radially outward expansion of the tightening element for forceably engaging the wall 138 of the recess 124 in which it is fitted.

Figure 7:
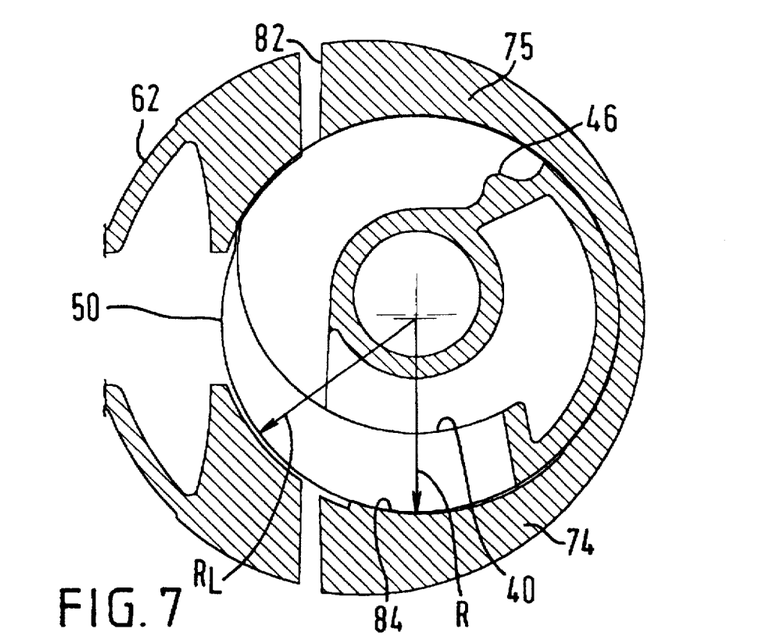
FIG. 7 is a top plan view similar to the view of FIG. 1 showing a first housing with the tightening element therein rotated approximately 90° clockwise from the position shown in FIG. 1.

As clockwise rotation of the tightening element 22 is continued beyond the position shown in FIG. 7, the camming surfaces 40 engaging the respective engaging surfaces 42 of the fastening element cause the fastening element to move axially towards the axis of rotation 44 of the tightening element. The initial effect of that movement is to pull the taper portions 60 into the corresponding taper portions of the through-passage 88 causing the second housing 28 to expand radially outwardly to forceably engage a wall 140 of the recess 132. Once the first and second housings have been expanded to forceably engage the walls of their respective recesses, further rotation of the tightening element applies a compressive force to the joint members 120, 122 ensuring that the joint is tightly made.

Two additional effects can be obtained by continued clockwise rotation of the tightening element beyond the point at which the first and second housings are forceably engaged with their respective recesses. Firstly, the tightening element tends to move slightly in the first housing towards the edge 126 of the joint member. This movement causes further expansion of the first housing by forcing the two halves of the first housing apart. Thus the forceable engagement between the outer periphery of the sleeve portion and the wall 138 of the recess 124 is intensified. It will be appreciated that the rotation of the tightening element provides two camming actions: firstly, the interaction of the cam means 50 and rib 84 and secondly, linear movement of the tightening element towards the second housing.

The second additional effect is the closure of any gap between the two joint members. Provided the recesses 124, 132 are sized correctly (i.e. within a predetermined tolerance) and the major surface 134 and edge 126 are flat, it should be possible to bring the two joint members together by hand as described above with no gap therebetween. In such a case, no pull-up of the joint in the tightening process is required. However, it is envisaged that these ideal conditions will not always be obtained and that a gap may initially be present as shown in FIG. 2. It will be understood that the resilience of the flexible membranes 62 allows the joint forming device to provide a pull-up action when required. In more detail, if when the two housings have been expanded into forceable engagement with the walls of their respective recesses there is a gap between the two members, the pulling force generated by the arcuate camming surfaces 40 which draws the fastening element towards the axis of rotation 44 causes the flexible membranes 62 to flex inwardly in the general direction of the first housing 26 such that the member 122 is pulled toward the member 120 via the second housing 28 to close the gap. Once the gap is closed, continued rotation of the tightening element applies a compressive force to the joint members which ensures that the joint is tightly made.

During the tightening process, the cooperable engagement of the protrusions 52 on the tightening element and the depressions 54 in the first housing provides a ratchet-like effect as the tightening element is rotated. Each ratchet step defines a locked position of the joint forming device. Thus once formed, there is no tendency for the joint to loosen due to vibration or slippage under load between the camming and engaging surfaces.

The joint can readily be disassembled by reversing the above-described tightening process. As the tightening element is rotated in the anti-clockwise sense, the resiliently deflected moveable portions 74, 75 move towards the outer periphery of the tightening element to return the first housing to a non-expanded condition and the fastening element is pushed away from the axis of rotation by virtue of contact between the surface 45 and the leading end 48 of the fastening element. If the tightening element is rotated anti-clockwise beyond the position at which the opening 32 is aligned with the through-passage 88, the leading end 48 of the fastening element is contacted by the ridge 46. The ridge 46 is configured to provide sufficient substantial movement of the fastening element away from the axis of rotation 44 to move the expansion portion 30 out of expanding engagement with the tapered portion of the through-passage 88. The movement of the fastening element provided by the ridge 46 ensures that the expansion portion 30 is moved to a position in which the second housing can return to its non-expanded condition.

With the first and second housing 26, 28 returned to a non-expanded condition, the joint can be disassembled by removing the housings from their respective recesses 124, 132. It will be appreciated that since the housings resiliently deform to assume an expanded condition, the joint forming device is re-usable.

With regard to outward expansion of the first housing 26, it has been found that in cases where the first housing has the split form of the embodiment, satisfactory results can be obtained without the provision of the moveable portions 74, 75. It is therefore possible for the first housing 26 to be provided in any one of the three forms: firstly in split form with moveable portions; secondly in split form without moveable portions; and thirdly with moveable portions but without a split. It will be appreciated that in each case, the first housing is adapted to expand generally radially outwardly during rotation of the tightening element.

With regard to the connecting means between the two housings, it is to be understood that although preferred, it is not essential that these are resilient. The connection may be by rigid means. However, in the case of a rigid connection, the pull-up action described above will not occur and thus the joint forming device may in certain circumstances provide a joint which although tightly made, has a gap between the joint members.

It is also to be understood that it is not essential that the first housing, second housing and connecting means therebetween are integral. Instead, the first and second housings may be releasably connected by the connecting means as shown in FIG. 8.

Figure 8:
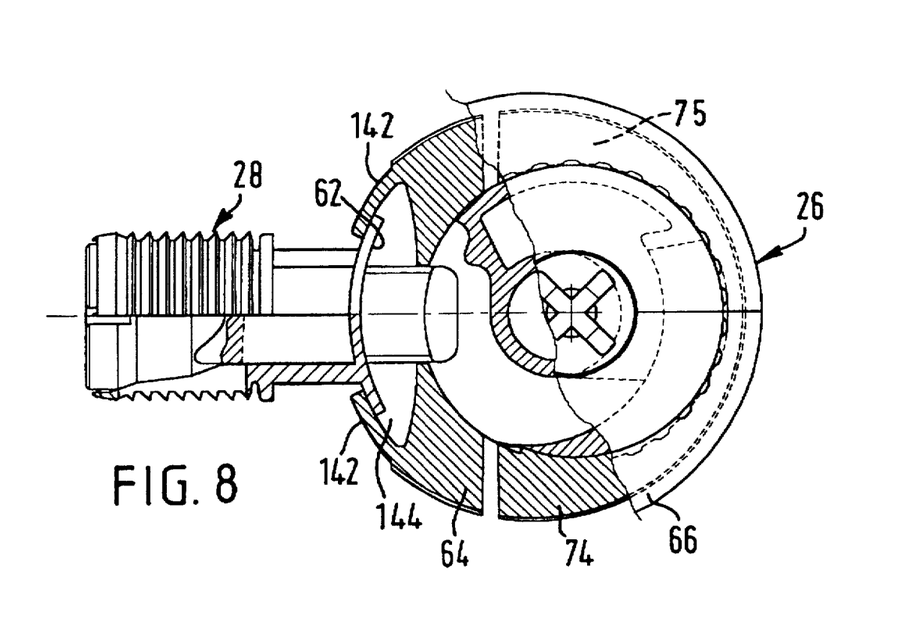
FIG. 8 is a partially sectioned top plan view of a joint forming device in which the first and second housings are releasably connected.

In FIG. 8, the configuration of the first housing and second housing is generally the same as the joint forming device shown in FIG. 1 and accordingly the same reference numerals will be used to describe like parts. Optionally, as shown, the first and second housings 26, 28 may be formed as one piece components and not split as in the FIG. 1 embodiment. The first housing 26 comprises a sleeve portion 64 having moveable portions 74, 75 and a planar cap portion 66. The sleeve portion 64 includes arcuate extension arms 142 which extend towards the second housing 28. The extension arms 142 and the cap portion 66 define a recess 144.

The second housing 28 comprises a flexible membrane 62 disposed at one end thereof. The membrane 62 includes an aperture through which the head portion 24 of the fastening element may protrude for engaging with the camming surfaces of the tightening element (not shown) and has respective portions extending from opposite sides of the second housing.

In order to connect the first and second housings 26, 28 the flexible membrane 62 is inserted into the recess 144. The configuration of the membrane 62 and extension arms 142 is such that there is interference therebetween to provide a force by which the connection between the housings is maintained. Thus the joint forming device of FIG. 8 can be supplied to the customer ready assembled as a unitary joint forming device.

The assembly of a joint with the FIG. 8 device and the tightening process corresponds to that described in connection with the device shown in FIGS. 1 to 7.

Further embodiments of the joint forming device showing alternative means for connecting the first and second housings will now be described with reference to FIGS. 9 to 11.

Figure 9:
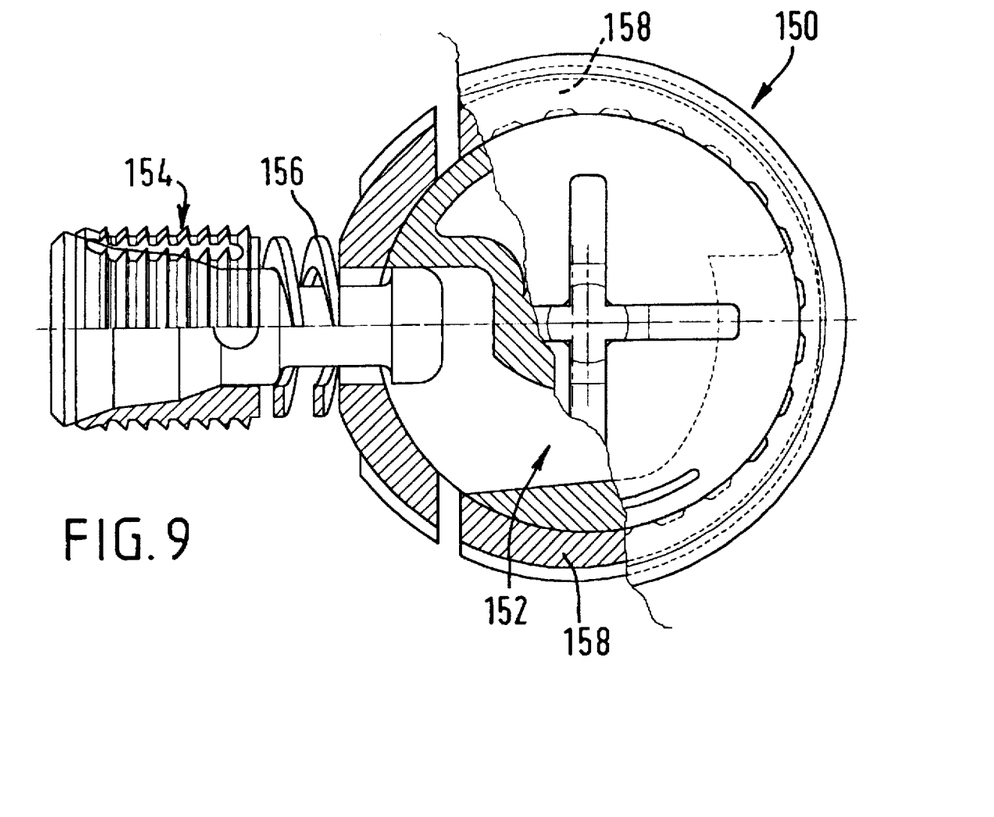
FIG. 9 is a partially sectioned top plan view of another joint forming device.

In FIG. 9, a first housing 150 housing a tightening element 152 is connected with a second housing 154 by resilient connecting means having the form of a coil spring 156. The first housing 150, second housing 154 and coil spring 156 are integral and can be manufactured as a one-piece plastics molding. It will be appreciated that the molding will not be split as in the case of the first described embodiment and that the first housing is provided with moveable portions 158 in order to obtain a radially outward expansion thereof by rotation of the tightening element. A joint between two members can be formed, tightened and disassembled in the manner described in connection with the joint forming device of FIGS. 1 to 7.

Figure 10:
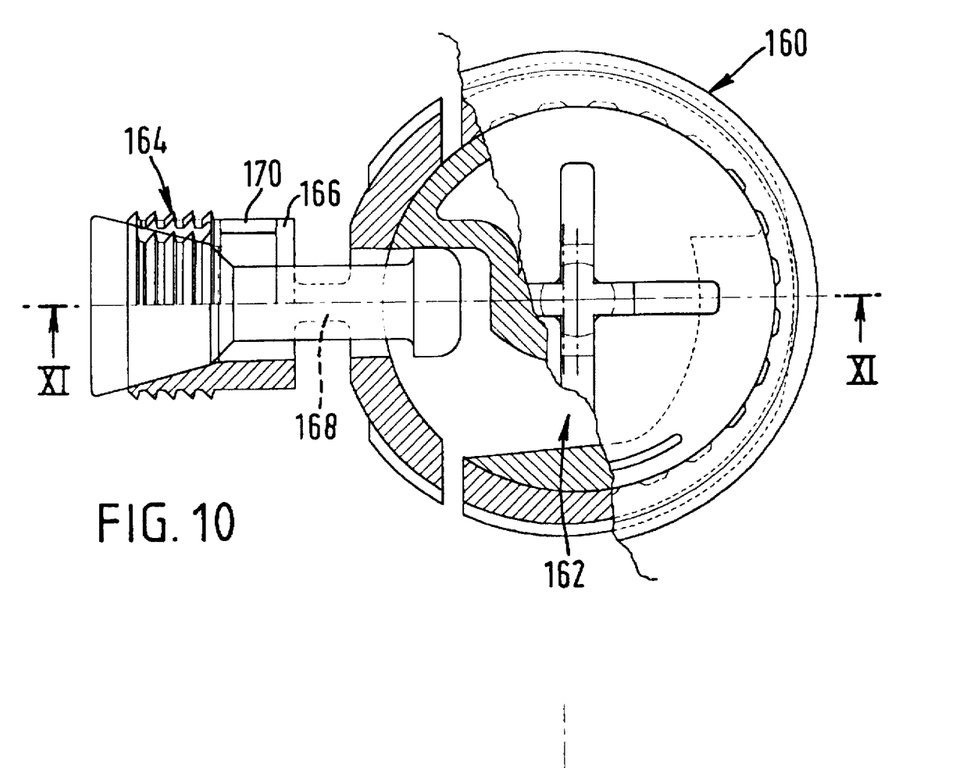
FIG. 10 is a partially sectioned top plan view of yet another joint forming device.
Figure 11:
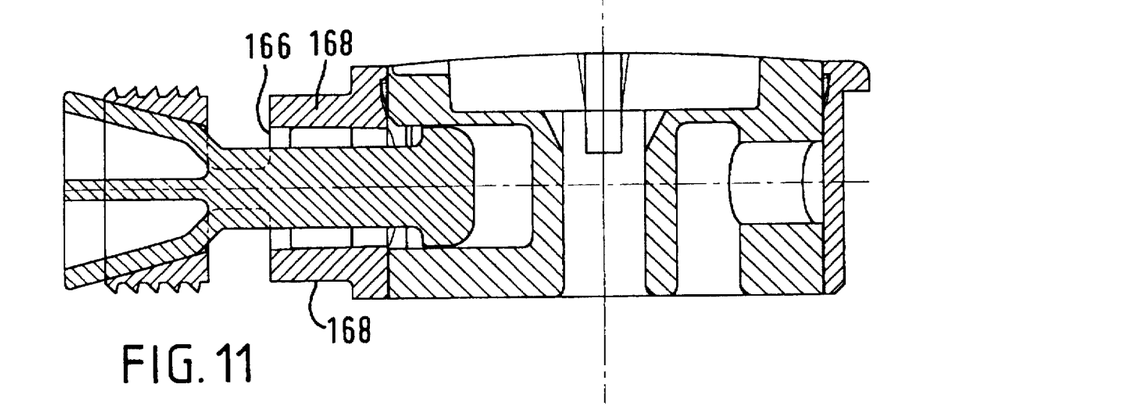
FIG. 11 is a section on line XI—XI in FIG. 10.

In FIGS. 10 and 11, a first housing 160 housing a tightening element 162 is connected with a second housing 164 by an integral resilient connecting means. The connecting means comprises a ring element 166 connected with respective opposed pairs struts 168, 170. The struts 168 extending from the first housing 160 are radially offset 90° with respect to the struts 170 which extend from the second housing. As with the FIG. 9 embodiment, the first housing 160, second housing 164 and the resilient connecting means 166, 168, 170 are integral and can be manufactured as a one-piece plastics molding. It will be appreciated that the molding may be a split molding if desired.

It will be appreciated that the fastening elements shown in FIGS. 9 to 11 have a head portion and neck portion which have a circular transverse cross-section and that the configuration of the leading end portion 56 of the fastening element 24 whilst advantageous is not essential. The configuration of the leading end portion 56, and in particular of the engaging surfaces 42, and of the camming surfaces 42 is such that when in cooperable engagement, there is engagement between the engaging surfaces the respective camming surfaces substantially over the length of the engaging surfaces and the load on the fastening element is transmitted axially. Furthermore, the undercut of the engaging surfaces causes them to dig into the camming surfaces which tend to be pulled together providing a clamping action on the fastening element. These features are disclosed in the first applicant's copending UK patent application (agent's reference number J.22863GB).

Figure 12:
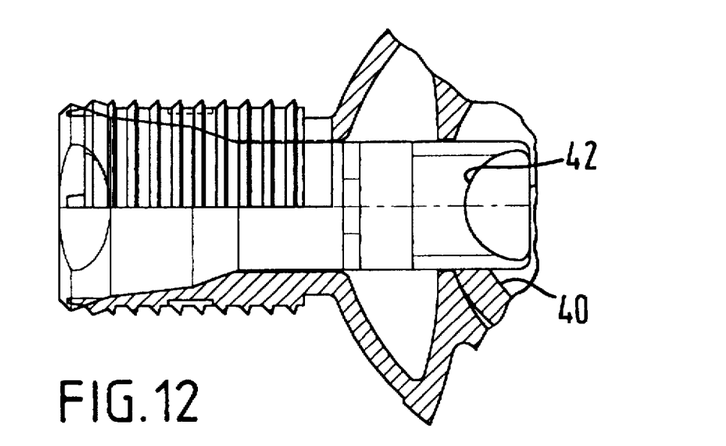
FIG. 12 is a view of a portion of FIG. 1 showing a modification to the fastening element.

A modification of the fastening element 24 is shown in FIG. 12. It will be appreciated that the curvature of the engaging surfaces 42 in the lengthwise direction thereof does not match the curvature of the camming surfaces 40 in the direction of the arcuate length thereof. In other respects, the configuration of the engaging surfaces 42 corresponds with that of the engaging surfaces 42 of the FIGS. 1 to 7 joint forming device; i.e. the engaging surfaces 42 in FIG. 12 are undercut in the direction transverse the length thereof. The increased curvature of the engaging surfaces 42 with respect to the camming surfaces 40 provides a clearance which ensures that the ends of the engaging surfaces do not dig into the camming surfaces during rotation of the tightening element. It will, however, be appreciated that the advantages of the above-mentioned clamping action and axial load carrying are obtained with the modified fastening element.

We claim:

1. A device for use in forming a joint between two members, said device comprising an elongate fastening element, a tightening element having at least one arcuate camming surface for cooperably engaging an engaging portion of said fastening element and means housing said fastening element and said tightening element with the or each said camming surface and said engaging portion positioned for said cooperable engagement, said housing means comprising a first housing housing said tightening element, said first housing being adapted for cooperative engagement with said tightening element, said first housing having means for expanding outwardly, a second housing housing at least an expansion portion of said fastening element, said second housing being adapted for cooperative engagement with said fastening element, said second housing having means for expanding outwardly, and means connecting said first and second housings, whereby in use with said first housing fitted to a recess in one of said joint members and said second housing fitted to a recess in the other of said joint members to form a joint therebetween, rotation of said tightening element in one sense about an axis of rotation thereof causes axial movement of said fastening element towards said axis of rotation causing said joint to tighten, said first housing and second housing each expanding generally radially outwardly during said rotation of said tightening element for forceably engaging walls of their respective recesses.

2. A device as claimed in claim 1, wherein said connecting means resiliently connects said housings.

3. A device as claimed in claim 2, wherein said connecting means comprises flexible membrane means.

4. A device as claimed in claim 1, wherein said first and second housings each comprise two body parts, said body parts of the first and second housings being snap-fittable together.

5. A device as claimed in claim 4, wherein the respective body parts of said first housing and second housing join in a common plane when snap-fitted together.

6. A device as claimed in claim 2, wherein said first housing, second housing and connecting means are integral, said connecting means having the form of a coil spring.

7. A device as claimed in claim 2, wherein said first housing, second housing and connecting means are integral, said connecting means comprising a ring element connecting with respective opposed struts extending from said first housing and said second housing, said struts extending from the first housing being radially offset with respect to said struts extending from the second housing.

8. A device as claimed in claim 1, wherein said first housing, said second housing and said connecting means comprise a one-piece plastics molding.

9. A device as claimed in claim 1, wherein said second housing is releasably connected with said first housing by said connecting means.

10. A device as claimed in claim 9, wherein said connecting means comprises flexible membrane means and said first housing defines recess means for receiving and engaging with said flexible membrane means.

11. A device as claimed in claim 1, wherein said means for expanding outwardly of said first housing comprises at least one moveable portion adapted to move generally radially outwardly of an outer periphery of the first housing for at least in part providing said radially outward expansion of the first housing.

12. A device as claimed in claim 11, wherein the or each said moveable portion is resiliently deflectable in response to said rotation of the tightening element.

13. A device as claimed in claim 11, wherein the or each said moveable portion is an integral part of the first housing and is separated partly from the remainder of said first housing by one or more slots provided in said first housing.

14. A device as claimed in claim 13, wherein the or each said moveable portion is separated partly from the remainder of said first housing by a generally L-shaped slot.

15. A device as claimed in claim 11, wherein the or at least one said moveable portion comprises cam means, said cam means being cooperable with the tightening element for causing said generally radially outward movement of the or said at least one moveable portion.

16. A device as claimed in claim 1, wherein said tightening element comprises external cam means for at least in part causing said generally radially outward expansion of the first housing.

17. A device as claimed in claim 1, wherein said first housing comprises formations for cooperably engaging with formations of said tightening element for facilitating locking of said device.

18. A device as claimed in claim 17, wherein said formations of the first housing comprise a plurality of circumferentially spaced depressions in a surface of the first housing which surface defines a recess for housing the tightening element and the formations of the tightening element comprise a plurality of protrusions on an external surface of the tightening element.

19. A device as claimed in claim 1, wherein said tightening element comprises cam means for causing axial movement of said fastening element in a direction away from said axis of rotation on rotation of said tightening element in the sense opposite said one sense for facilitating release of said fastening element from a tightened condition.

20. A device as claimed in claim 19, wherein said cam means comprises a surface which extends generally parallel to said axis of rotation of the tightening element for engaging a leading end of said fastening element.

21. A device as claimed in claim 1, wherein said engaging portion comprises a respective engaging surface for the or each said arcuate camming surface, the or each engaging surface having a length extending transversely of a longitudinal axis of the fastening element and being adapted such that said cooperable engagement with the respective arcuate camming surface in the direction of the length of the arcuate camming surface occurs substantially over the length of the engaging surface.

22. A device as claimed in claim 21, wherein in a direction transverse said length thereof the or each engaging surface extends radially outwardly and axially inwardly with respect to the longitudinal axis of the fastening element.

23. A device as claimed in claim 21, wherein said engaging portion comprises two said engaging surfaces, each said engaging surface being defined by a wall of a respective slot extending transversely of the longitudinal axis of the fastening element.

24. A device as claimed in claim 1, wherein said engaging portion of the fastening element has a generally rectangular transverse cross-section.

25. A device as claimed in claim 1, wherein said first housing and second housing each comprise external formations for gripping said wall of their respective recesses.

* * * * *